United States Patent [19]

Kobayashi

[11] 4,273,375
[45] Jun. 16, 1981

[54] DEVICE FOR PREVENTING AIR-CONDITIONING WARM OR COOL BLAST FROM BLOWING THROUGH UNDER A SEAT

[75] Inventor: Fumiaki Kobayashi, Toyota, Japan

[73] Assignee: Toyota Jidosha Kogyo Kabushiki Kaisha, Toyota, Japan

[21] Appl. No.: 98,888

[22] Filed: Nov. 30, 1979

Related U.S. Application Data

[62] Division of Ser. No. 895,385, Apr. 11, 1978.

[30] Foreign Application Priority Data

Dec. 1, 1977 [JP] Japan .............................. 52/161363

[51] Int. Cl.³ ............................................ B62D 27/04
[52] U.S. Cl. .................................. 296/65 R; 297/180
[58] Field of Search .................. 296/65 R, 63, 66; 297/180, 217

[56] References Cited

U.S. PATENT DOCUMENTS

| | | | |
|---|---|---|---|
| 3,632,154 | 1/1972 | Woodrich | 296/63 |
| 3,931,994 | 1/1976 | Palmiter | 280/150 B X |
| 4,095,837 | 1/1978 | Hunter | 49/404 X |
| 4,118,062 | 10/1978 | Harder, Jr. et al. | 296/63 |
| 4,157,797 | 6/1979 | Fox | 296/65 R X |
| 4,199,187 | 4/1980 | Kobayashi | 296/63 |

*Primary Examiner*—Randolph A. Reese
*Assistant Examiner*—Norman L. Stack
*Attorney, Agent, or Firm*—Stevens, Davis, Miller & Mosher

[57] ABSTRACT

In order to prevent warm or cool blast from an air conditioner from blowing through the interspace between the bottom of a seat cushion and the floor of the body of a car, a warm or cool blast-intercepting member is disposed at a front end and side ends under the seat cushion.

17 Claims, 9 Drawing Figures

DEVICE FOR PREVENTING AIR-CONDITIONING WARM OR COOL BLAST FROM BLOWING THROUGH UNDER A SEAT

This is a division of application Ser. No. 895,385, filed Apr. 11, 1978.

This invention relates to a device with which air-conditioning warm or cool blast from the air blowout port of an air conditioner installed in an automobile is prevented from passing through under a seat.

Usually, an interspace exists between the bottom of a seat cushion and the floor in an automobile. Therefore, air-conditioning warm or cool draft blown out from an air conditioner passes through the interspace, it impinges on a floor iron plate which is sometimes exposed, and it goes out of ventilating openings as it is. It is accordingly impossible to carry out an efficient air conditioning. In case of heating, in order to prevent heat loss at the passage of the warm draft through the interspace, a heat insulator such as floor mat for bestowing a heat insulating property must be arranged also on the floor underneath the seat cushion.

An object of this invention is to prevent the air-conditioning warm or cool draft from passing through the interspace between the bottom of the seat cushion and the floor of the car body, thereby to raise the efficiencies of air cooling and heating and to enhance the heat insulating property of the floor underneath the seat.

Other objects, features and advantages of the invention will appear more fully from the following description taken in conjunction with the accompanying drawings in which.

Figure 1:
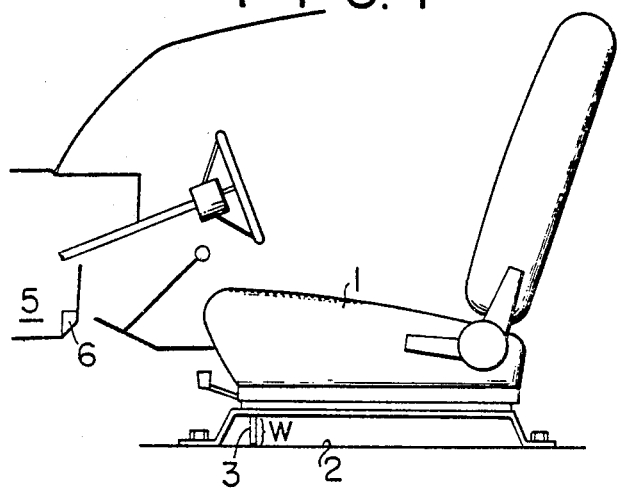
FIG. 1 is a side view showing a first embodiment of this invention.
Figure 2:
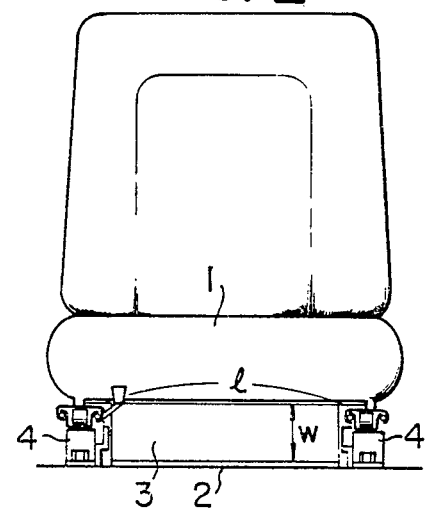
FIG. 2 is a front view of the first embodiment.

FIGS. 1 and 2 show a first embodiment of this invention. An interceptive plate 3 which is a substantially oblong interceptive member is secured under the front edge part of a seat cushion 1 by, for example, screwing. The interceptive plate has a width W which is substantially equal to the height of the interspace between the bottom of the seat cushion 1 and the floor 2 of a car body, and a length l which is substantially equal to the length of the seat cushion 1 in the breadth direction of a car. In order to prevent the interceptive plate 3 from hindering the frontward and rearward slide operations of the seat cushion 1, both end parts of the interceptive plate in the breadth direction are cut into shapes avoiding seat tracks 4. The interceptive plate 3 may be an iron plate, a rubber sheet, a piece of cloth, a polyvinyl sheet or the like which cuts off the passage of warm or cool draft.

As described above, the interceptive plate 3 which blockades the interspace between the bottom of the seat cushion 1 and the floor 2 of the car body is secured under the front edge part of the seat cushion 1. Thus, the warm or cool draft from an air blowout port 6 of an air conditioner 5 disposed at a fore part of the vehicle is intercepted by the interceptive plate 3 and is prevented from passing through underneath the seat cushion 1. The interceptive plate 3 is secured onto the side of the seat cushion 1, and even when the seat cushion 1 is slidden frontwards or rearwards, the interceptive plate 3 can move integrally with the seat cushion 1 and can prevent the warm or cool draft from passing through the interspace under the seat cushion.

Figure 4:
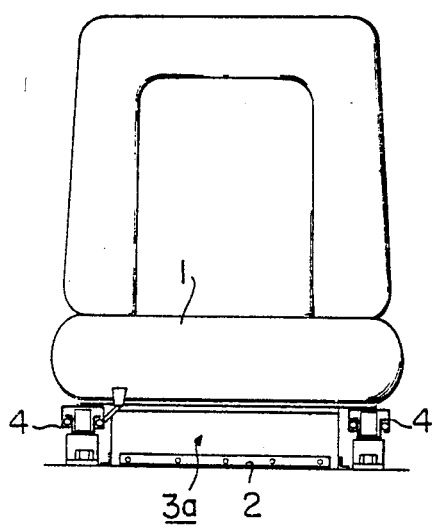
FIG. 4 is a front view of the second embodiment.
Figure 3:
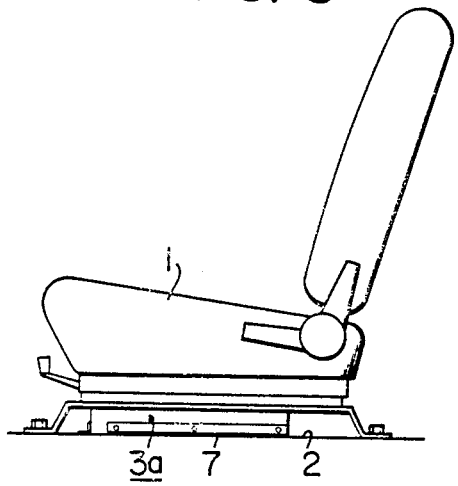
FIG. 3 is a side view showing a second embodiment of this invention.
Figure 5:
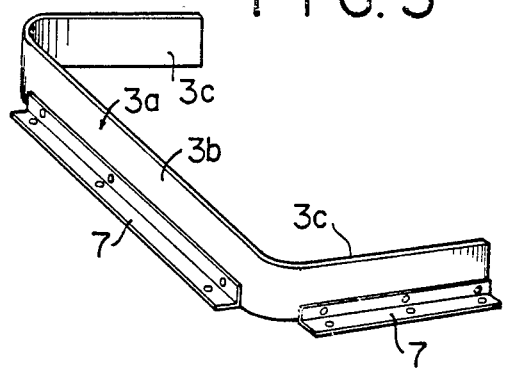
FIG. 5 is a perspective view of a warm or cool draft-intercepting member in the second embodiment.

FIGS. 3 to 5 show a second embodiment of this invention. An interceptive plate 3a is formed into a substantially U-shaped structure which has a front face part 3b and both side face parts 3c. This interceptive plate 3a is secured to the floor 2 of the car body underlying the seat cushion 1 through a flange member 7 by, for example, screwing. The remaining construction is the same as in the first embodiment. Of course, the interceptive plate 3a may be attached to the bottom of the seat cushion 1.

As described above, in the embodiment, the interceptive plate 3a extends, not only at the front face part, but also at the side face parts of the interspace under the seat cushion 1. Thus, the air-conditioning warm or cool draft is perfectly prevented from turning round into, and passing through, the interspace underlying the seat cushion.

Figure 6:
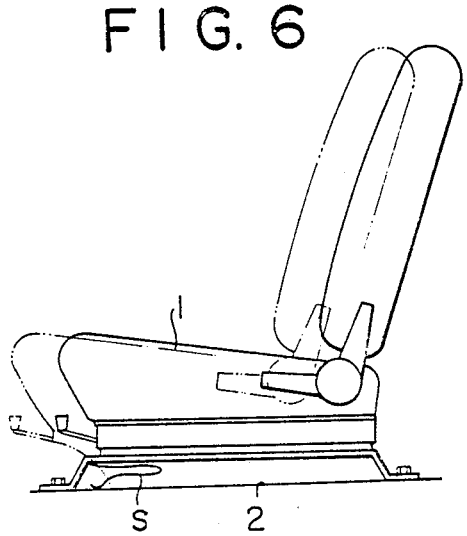
FIG. 6 is a side view showing a third embodiment of this invention.
Figure 7:
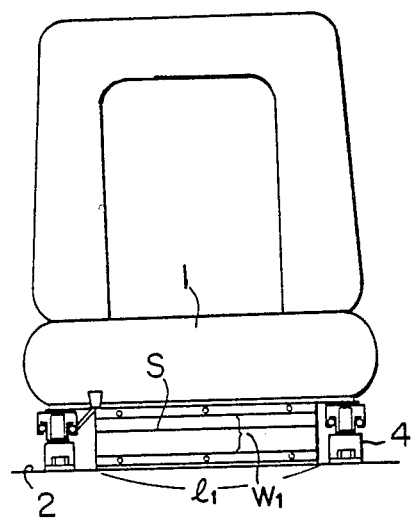
FIG. 7 is a front view of the third embodiment.

FIGS. 6 and 7 show a third embodiment of this invention. An interceptive member in this embodiment is made of a pliable sheet S such as cloth and synthetic resin sheet. As in the first embodiment, the sheet S has a length $l_1$ which is substantially equal to the length of the seat cushion 1 in the breadth direction of the car. The upper edge of the sheet S is secured to a front edge under the seat cushion 1, while the lower edge thereof is secured to the floor 2 of the car body.

The sheet S has a width $W_1$ which suffices for the quantity of slide in the case where the seat cushion 1 is slidden frontwards and rearwards as indicated by dotted lines. As described above, in this embodiment, the sheet S being the interceptive member ha the upper end surface secured to the bottom of the seat cushion 1 and has the lower end surface secured to the floor 2 of the car body. Thus, the air-conditioning warm or cool draft can be perfectly prevented from passing from the front face of the interspace under the seat cushion through the interspace. Moreover, the width $W_1$ of the sheet S corresponds to the quantity of slide of the seat cushion 1. Therefore, even when the seat cushion 1 is slidden frontwards or rearwards, the sheet S stretches itself to blockade the interspace between the bottom of the seat cushion and the floor of the car body at all times, and it causes quite no hindrance to the slide operations of the seat cushion.

As the interceptive member, bellows formed of a synthetic resin sheet, a rubber sheet or the like may be used instead of the sheet S. Also in this case, the width with the quantity of slide of the seat cushion 1 taken into account is, of course, required.

Figure 8:
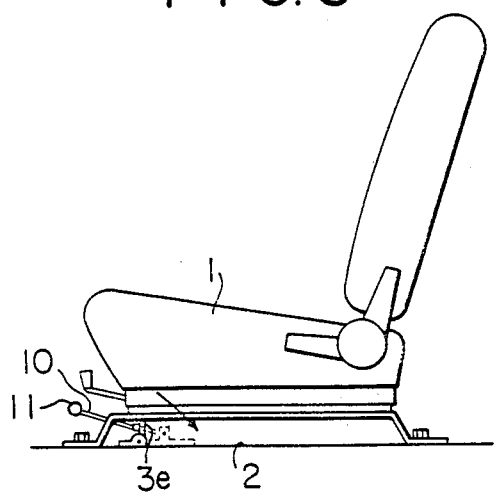
FIG. 8 is a side view showing a fourth embodiment of this invention.
Figure 9:
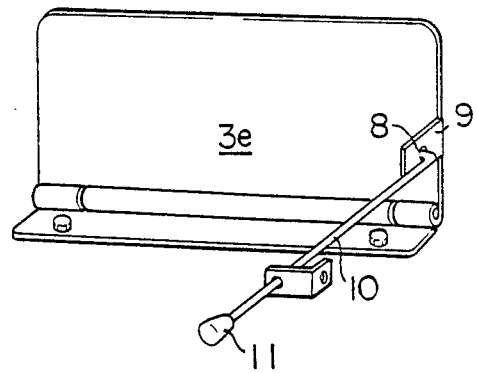
FIG. 9 is a perspective view of an interceptive member in the fourth embodiment.

FIGS. 8 and 9 show a fourth embodiment of this invention. An interceptive plate 3e having the same shape as in the first embodiment is secured through a hinge structure 12 to the floor 2 of the car body underlying the seat cushion 1. A flange portion 9 is provided on one side of the interceptive plate 3e. The flange portion 9 has an aperture 8 in which one end of a control rod 10 for throwing down the interceptive plate 3e is snugly inserted. A knob 11 is mounted on the fore end of the control rod 10. By pushing the knob 11 backwards, the interceptive plate 3e is thrown down rearwards as indicated by arrow a in FIG. 8. Owing to this construction, in case where the air conditioner is not used, it can be kept thrown down on the floor of the car body. Even when, for example, the seat cushion is slidden rearwards in a large amount, the interceptive member causes no hindrance.

As set forth above, according to this invention, at least one of the upper edge and the lower edge of a warm or cool draft-intercepting member which is disposed in at least the front edge part of an interspace underlying a seat cushion and which has a width substantially equal to the height of the interspace between the bottom of the seat cushion and the floor of the body of a car is secured to the bottom of the seat cushion or the floor of the car body. Owing to the arrangement of the interceptive member of such a width in the interspace between the bottom of the seat cushion and the floor of the car body, the warm or cool air blown out from an air conditioner does not pass through the interspace, so that the loss of the air-conditioning warm or cool draft can be reduced and that an efficient air conditioning can be executed. Furthermore, at the time of heating, a heat insulating property can be attained without disposing a heat insulator such as floor mat on the floor of the car body underneath the seat cushion as in the prior art, so that materials to be used can be saved and that the feeling at the feet can be enhanced.

What I claim is:

1. In a vehicle having a floor and a seat, spaced above the floor, which is adjustably slidable forwardly and rearwardly on tracks, the improvement comprising a shield for blocking the flow of cooling or heating air from locations forward of the seat beneath the seat between it and the floor to a region to the rear of the seat, said shield comprising:
   a one-piece substantially imperforate plate, U-shaped in plan, having upper and lower horizontal edges, said lower edge being fixedly secured to the floor, said plate having a width, throughout substantially its entire extent, substantially equal to the spacing of the seat from the floor and extending vertically therebetween, said U-shaped plate including:
   a central bight section, adjacent to and below the front of the seat, having a length substantially equal to the width of the seat,
   a first arm extending rearwardly from one end of the bight section adjacent to and below one side of the seat for a distance of over half the length of that one side, and
   a second arm extending rearwardly from the other end of the bight section adjacent to and below the other side of the seat for a distance of over half the length of that other side.

2. The apparatus of claim 1, further comprising:
   an elongated flange member, L-shaped in transverse cross-section, the horizontal section of said flange member being fixedly secured to the floor and the vertical section of said flange member being fixedly secured to the bight section.

3. The apparatus of claim 1, wherein:
   the plate is made of iron.

4. The apparatus of claim 1, wherein:
   the plate is made of rubber.

5. The apparatus of claim 1, wherein:
   the plate is made of polyvinyl.

6. In a vehicle having a floor and a seat, spaced above the floor, which is adjustably slidable forwardly and rearwardly on tracks, the improvement comprising a shield for blocking the flow of cooling or heating air from locations forward of the seat beneath the seat between it and the floor to a region to the rear of the seat, said shield comprising:
   a substantially rectangular substantially imperforate plate having horizontal upper and lower sides, a length substantially equal to but slightly less than the width of the seat, and a width substantially equal to the spacing of the seat from the floor, said plate being fixedly secured to the floor and being manually pivotable about a horizontal axis adjacent and parallel to its lower side.

7. The apparatus of claim 6, wherein:
   the lower side of said plate is secured to the floor adjacent the front edge of the bottom of the seat.

8. The apparatus of claim 6, wherein:
   the plate is made of iron.

9. The apparatus of claim 6, further comprising:
   a hinge through which the plate is pivotable, said hinge being secured to the floor.

10. The apparatus of claim 9, wherein:
    said hinge comprises:
    a first part fixedly secured to the floor; and
    a second part integral with the plate at the lower side thereof.

11. The apparatus of claim 10, further comprising:
    a control rod, one end of which is pivotally connected to said plate for pivoting said plate; and
    a control knob on the other end of said control rod.

12. The apparatus of claim 6, wherein:
    the plate is made of rubber.

13. The apparatus of claim 6, wherein:
    the plate is made of polyvinyl.

14. In a vehicle having a floor and a seat, spaced above the floor, which is adjustably slidable forwardly and rearwardly on tracks by adjustment means, the improvement comprising a shield for blocking the flow of cooling or heating air from locations forward of the seat beneath the seat between it and the floor to a region to the rear of the seat, said shield comprising:
    a fixedly secured substantially rectangular vertically disposed plate, separate from said adjustment means having horizontal upper and lower sides, a length substantially equal to the width of the seat and a width substantially equal to the spacing of the seat from the floor and extending therebetween and from adjacent one side of the seat to the other side thereof, said plate is fixedly secured adjacent the front edge of the bottom of the seat and rearwardly spaced from the front edge and the upper side of the plate extends along the front edge of the bottom of the seat in close proximity thereto and rearwardly spaced from the front edge.

15. The apparatus of claim 14, wherein:
    said plate is made of iron.

16. The apparatus of claim 14, wherein:
    the plate is made of rubber.

17. The apparatus of claim 14, wherein:
    the plate is made of polyvinyl.

* * * * *